United States Patent
Torres et al.

(10) Patent No.: US 10,128,749 B2
(45) Date of Patent: Nov. 13, 2018

(54) METHOD AND CIRCUITRY FOR SENSING AND CONTROLLING A CURRENT

(71) Applicant: Texas Instruments Incorporated, Dallas, TX (US)

(72) Inventors: Erick Omar Torres, Allen, TX (US); Harish Venkataraman, Wylie, TX (US); Philomena C. Brady, Corinth, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 648 days.

(21) Appl. No.: 14/274,848

(22) Filed: May 12, 2014

(65) Prior Publication Data

US 2015/0326121 A1 Nov. 12, 2015

(51) Int. Cl.
*H02M 3/156* (2006.01)
*H02M 3/158* (2006.01)
*H02M 1/00* (2006.01)

(52) U.S. Cl.
CPC .......... *H02M 3/156* (2013.01); *H02M 3/158* (2013.01); *H02M 2001/0009* (2013.01)

(58) Field of Classification Search
USPC ......... 323/271, 273, 274–277, 279, 280–282
See application file for complete search history.

(56) References Cited

U.S. PATENT DOCUMENTS

| | | | |
|---|---|---|---|
| 7,706,156 B2 | 4/2010 | Hsieh et al. | |
| 8,362,755 B2 * | 1/2013 | Noda | H02M 3/156 323/285 |
| 8,541,999 B2 | 9/2013 | Athas et al. | |

(Continued)

FOREIGN PATENT DOCUMENTS

| | | |
|---|---|---|
| CN | 101666824 | 7/2011 |
| CN | 102577060 A | 7/2012 |

(Continued)

OTHER PUBLICATIONS

Chinese Office Action (8 pages) dated Jul. 17, 2017 for Application No. CN 2014800787918, which claims priority to Application No. PCT/US2014/058192, which claims priority to U.S. Appl. No. 14/274,848.

(Continued)

*Primary Examiner* — Harry Behm
*Assistant Examiner* — Bryan R Perez
(74) *Attorney, Agent, or Firm* — Michael A. Davis, Jr.; Charles A. Brill; Frank D. Cimino

(57) ABSTRACT

An inductor conducts a first current, which is variable. A first transistor is coupled through the inductor to an output node. The first transistor alternately switches on and off in response to a voltage signal, so that the first current is: enhanced while the first transistor is switched on in response to the voltage signal; and limited while the first transistor is switched off in response to the voltage signal. A second transistor is coupled to the first transistor. The second transistor conducts a second current, which is variable. On/off switching of the second transistor is independent of the voltage signal. Control circuitry senses the second current and adjusts the voltage signal to alternately switch the first transistor on and off in response to: the sensing of the second current; and a voltage of the output node.

20 Claims, 3 Drawing Sheets

(56) References Cited

U.S. PATENT DOCUMENTS

| | | | |
|---|---|---|---|
| 2003/0034766 A1 | 2/2003 | Zafarana et al. | |
| 2008/0019155 A1 | 1/2008 | Morishima et al. | |
| 2008/0224676 A1* | 9/2008 | Kudo | H03K 5/08 |
| | | | 323/282 |
| 2009/0033289 A1* | 2/2009 | Xing | H02J 7/0065 |
| | | | 320/140 |

FOREIGN PATENT DOCUMENTS

| | | |
|---|---|---|
| CN | 103004071 A | 3/2013 |
| WO | 2011016974 A2 | 2/2011 |
| WO | 2012015427 A1 | 2/2012 |
| WO | 2014043219 A2 | 3/2014 |

OTHER PUBLICATIONS

English translation of Chinese Office Action (8 pages) dated Jul. 17, 2017 for Application No. CN 2014800787918, which claims priority to Application No. PCT/US2014/058192, which claims priority to U.S. Appl. No. 14/274,848.

* cited by examiner

METHOD AND CIRCUITRY FOR SENSING AND CONTROLLING A CURRENT

BACKGROUND

The disclosures herein relate in general to electronic circuitry, and in particular to a method and circuitry for sensing and controlling a current.

FIG. 1 (prior art) is a schematic electrical circuit diagram of a conventional step down converter, indicated generally at 100. For sensing current of a high-side power n-channel field-effect transistor ("NFET") $MN_1$, an NFET $MN_{SNS}$ is connected in parallel with $MN_1$, so that both of them share common drain and gate connections. The drains of $MN_1$ and $MN_{SNS}$ are connected to an input voltage node (having a voltage $V_{IN}$). The gates of $MN_1$ and $MN_{SNS}$ are connected to an output of a driver 102, which: (a) receives a voltage signal $V_{GD}$ from control circuitry 104; and (b) drives $V_{GD}$ through such output to those gates.

A source of $MN_{SNS}$ is connected to a node A, which is further connected to a first input ("+") of an amplifier 106. A source of $MN_1$ is connected to a node B (having a voltage $V_{SW}$), which is further connected to a second input ("−") of the amplifier 106. An output of the amplifier 106 is connected to a gate of an NFET $MN_A$.

A source of $MN_A$ is connected to a ground, and a drain of $MN_A$ is connected to the node A as feedback. Accordingly, while the amplifier 106 is active, $MN_A$ and the amplifier 106 operate together for holding the node A's voltage relatively near (e.g., slightly above) the node B's voltage. In that manner, $MN_{SNS}$ senses a current that flows through $MN_1$, while $MN_A$ senses a current that flows through $MN_{SNS}$. An NFET $MN_B$ mirrors a current that flows through $MN_A$.

While $MN_1$ and $MN_{SNS}$ are turned on, they conduct respective amounts of current, according to a channel width ratio between $MN_1$ and $MN_{SNS}$. In one example, such channel width ratio is relatively large, so that $MN_1$ conducts current on an order of amps, while $MN_{SNS}$, $MN_A$ and $MN_B$ conduct current on an order of microamps.

As shown in FIG. 1, the node B is coupled through a diode 108 (having a voltage drop $-V_D$) to the ground. Also, the node B is coupled through an inductor L (having a variable current $I_L$) to a node C (having a voltage $V_{OUT}$). The node C is coupled through a capacitor C to the ground. Further, the node C is coupled through a load 110 (having a current $I_{LOAD}$) to the ground.

The control circuitry 104 is connected to a drain of $MN_B$. In response to a current $I_{SENSE}$ that flows through $MN_B$, and in response to $V_{OUT}$, the control circuitry 104 suitably adjusts $V_{GD}$ as feedback to control (e.g., selectively enhance, and selectively limit) $I_L$ by alternately switching $MN_1$'s gate on and off.

During each switching cycle, $V_{SW}$ swings from $-V_D$ to near $V_{IN}$. In one example, the amplifier 106: (a) is inactive while $V_{SW} \approx -V_D$, which is outside an input range of the amplifier 106; and (b) becomes active when $V_{SW}$ rises to near $V_{IN}$. Nevertheless, while $V_{SW}$ rises, $I_{SENSE}$ incorrectly overshoots, because $MN_1$'s initial $V_{DS} \approx V_{IN}+V_D$. Accordingly, the control circuitry 104 ignores $I_{SENSE}$ at the beginning (blanking time) of each switching cycle, which limits a minimum duty cycle of the circuitry 100 and its maximum switching frequency.

Also, through the node B, the second input ("−") of the amplifier 106 is directly connected to an external high-voltage switching node, which exposes the second input ("−") to the switching node's parasitics and electrostatic discharge ("ESD"). Accordingly, to protect the second input ("−") against high-voltage ESD, the amplifier 106 includes additional circuitry for such protection, even if $MN_1$ is self-protecting.

SUMMARY

An inductor conducts a first current, which is variable. A first transistor is coupled through the inductor to an output node. The first transistor alternately switches on and off in response to a voltage signal, so that the first current is: enhanced while the first transistor is switched on in response to the voltage signal; and limited while the first transistor is switched off in response to the voltage signal. A second transistor is coupled to the first transistor. The second transistor conducts a second current, which is variable. On/off switching of the second transistor is independent of the voltage signal. Control circuitry senses the second current and adjusts the voltage signal to alternately switch the first transistor on and off in response to: the sensing of the second current; and a voltage of the output node.

DETAILED DESCRIPTION

Figure 1:
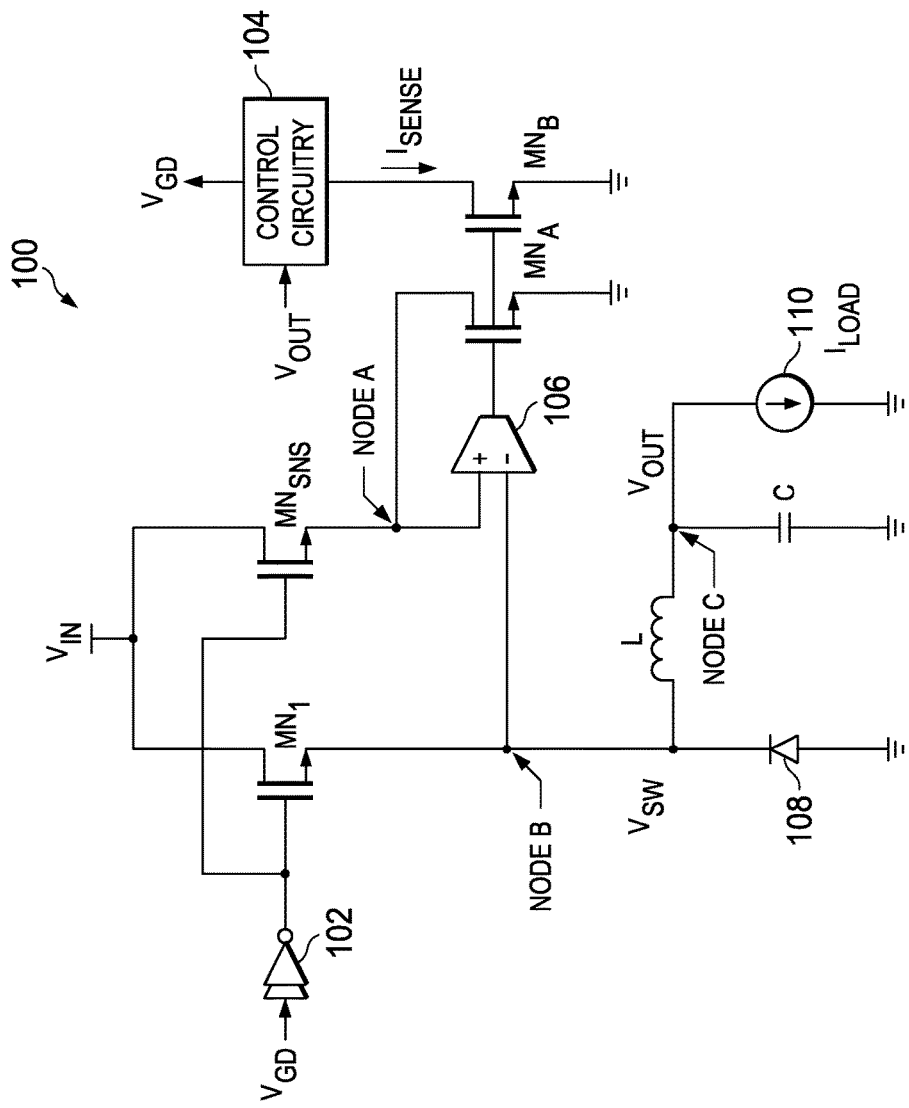
FIG. 1 (prior art) is a schematic electrical circuit diagram of a conventional step down converter.
Figure 2:
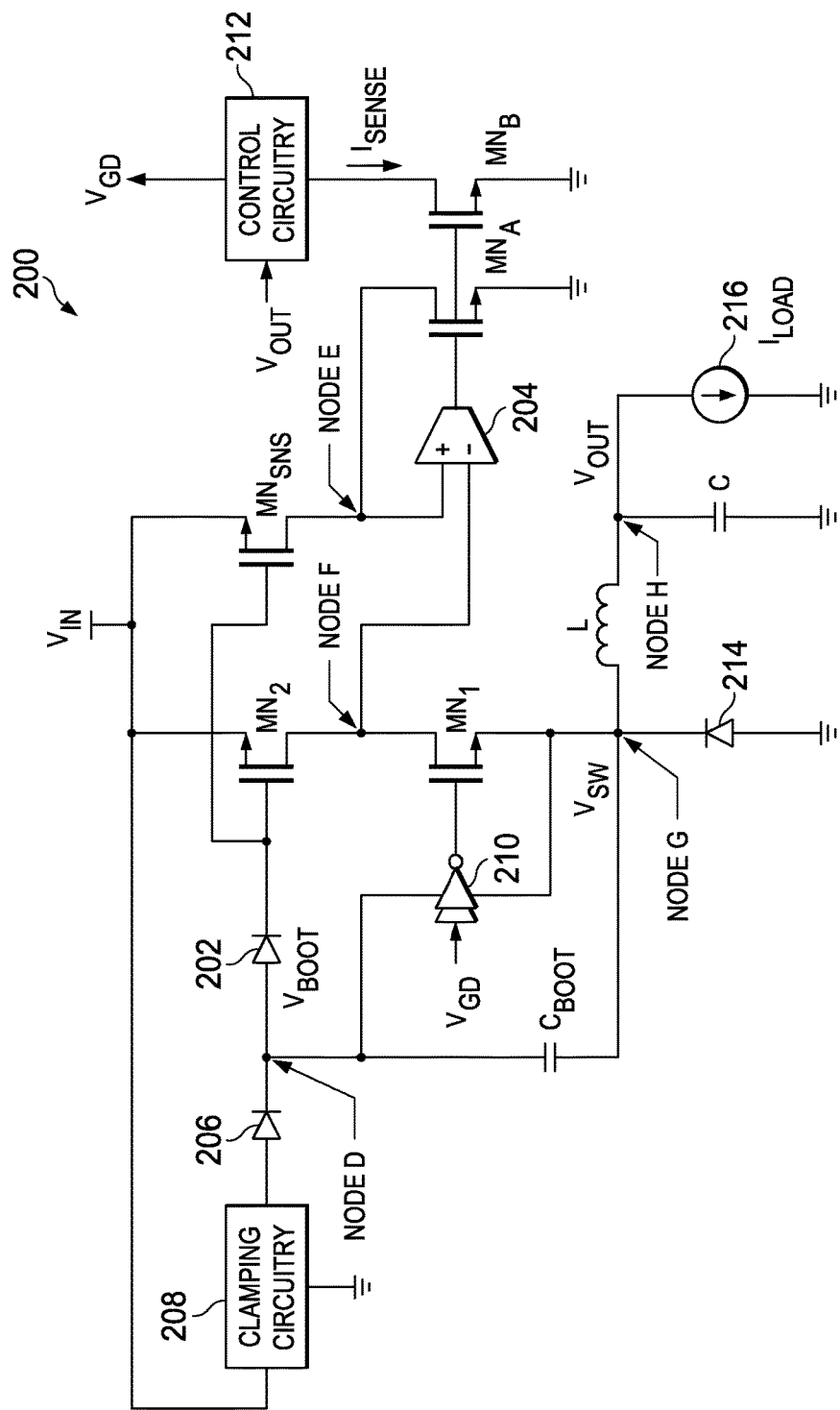
FIG. 2 is a schematic electrical circuit diagram of a step down converter of the illustrative embodiments.

FIG. 2 is a schematic electrical circuit diagram of a step down converter, indicated generally at 200, of the illustrative embodiments. In FIG. 2, an NFET $MN_{SNS}$ is connected in parallel with an NFET $MN_2$, so that both of them share common source and gate connections. The sources of $MN_2$ and $MN_{SNS}$ are connected to an input voltage node (having a voltage $V_{IN}$). The gates of $MN_2$ and $MN_{SNS}$ are coupled through a diode 202 to a node D. The node D has a voltage $V_{BOOT}$.

A drain of $MN_{SNS}$ is connected to a node E, which is further connected to a first input ("+") of an amplifier 204. A drain of $MN_2$ is connected to a node F, which is further connected to a second input ("−") of the amplifier 204. An output of the amplifier 204 is connected to a gate of an NFET $MN_A$.

A source of $MN_A$ is connected to a ground, and a drain of $MN_A$ is connected to the node E as feedback. While the amplifier 204 is active, $MN_A$ and the amplifier 204 operate together for holding the node E's voltage relatively near (e.g., slightly above) the node F's voltage. In that manner, $MN_{SNS}$ mirrors a variable current that flows through $MN_2$, while $MN_A$ senses a current that flows through $MN_{SNS}$. An NFET $MN_B$ mirrors a current that flows through $MN_A$.

While $MN_2$ and $MN_{SNS}$ are turned on, they conduct respective amounts of current, according to a channel width ratio between $MN_2$ and $MN_{SNS}$. In one example, such channel width ratio is relatively large, so that $MN_2$ conducts current on an order of amps, while $MN_{SNS}$, $MN_A$ and $MN_B$ conduct current on an order of microamps.

The node D is coupled through a diode 206 to clamping circuitry 208, which receives power from its connection between the input voltage node and the ground. Also, the node D is coupled through a capacitor $C_{BOOT}$ to a node G (having a voltage $V_{SW}$). A driver 210 is coupled between the node D and the node G, so the driver 210 receives its power from $C_{BOOT}$.

A gate of an NFET $MN_1$ is connected to an output of the driver 210, which: (a) receives a voltage signal $V_{GD}$ from control circuitry 212; and (b) drives $V_{GD}$ through such output to such gate. A drain of $MN_1$ is connected to the node F, and a source of $MN_1$ is connected to the node G.

As shown in FIG. 2, the node G is coupled through a diode 214 (having a voltage drop $-V_D$) to the ground. Also, the node G is coupled through an inductor L (having a variable current $I_L$) to a node H (having a voltage $V_{OUT}$). The node H is coupled through a capacitor C to the ground. Further, the node H is coupled through a load 216 (having a current $I_{LOAD}$) to the ground.

The control circuitry 212 is connected to a drain of $MN_B$. In response to a current $I_{SENSE}$ that flows through $MN_B$, and in response to $V_{OUT}$, the control circuitry 212 suitably adjusts $V_{GD}$ as feedback to control $I_L$ by alternately switching $MN_1$'s gate on and off. For example: (a) $MN_1$ enhances $I_L$ while $MN_1$ is switched on in response to $V_{GD}$; and (b) $MN_1$ limits $I_L$ while $MN_1$ is switched off in response to $V_{GD}$.

In one example of the circuitry 200 operation, $V_{IN}$ is approximately 10 volts, and the clamping circuitry 208 operates to charge $C_{BOOT}$, so that $C_{BOOT}$ has a substantially constant voltage of ~5 volts. In that manner, $V_{BOOT}-V_{SW}=$~5 volts, which is always sufficient to power the driver 210, and $V_{BOOT}$ is always high enough to turn on $MN_2$. Accordingly, in such operation, $MN_2$ is always on and continues to conduct at least some current, irrespective of whether $MN_1$ is switched on, so that on/off switching of $MN_2$ is independent of $V_{GD}$.

While $MN_1$ is switched off, $V_{SW}=-V_D$, (e.g., -0.7 volts), $V_{BOOT}=V_{SW}+$~5 volts, and $MN_2$'s~$V_{DS}\approx 0$ volts (e.g., because current isn't flowing through $MN_2$). While $MN_1$ is switched on, $V_{SW}\approx V_{IN}=10$ volts, $V_{BOOT}=V_{SW}+$~5 volts, and $MN_2$'s $V_{DS}\approx$100s of millivolts (e.g., $MN_2$'s resistance multiplied by current flowing through $MN_2$). Accordingly, because $MN_2$'s drain voltage $V_D$ is always equal to $V_{IN}=10$ volts, $MN_2$'s $V_{DS}$ swings between ~0 volts and 100s of millivolts, even while $V_{SW}$ swings between $-V_D$ and ~10 volts.

In that manner, $I_{SENSE}$ has less overshoot (e.g., current spike) in response to $MN_1$ being turned on. A speed of $I_{SENSE}$ settling is primarily determined by a speed of $MN_A$ and the amplifier 204. Because $I_{SENSE}$ has less overshoot in response to $MN_1$ being turned on, the control circuitry 212 has less blanking time at the beginning of each switching cycle. Accordingly, the control circuitry 212 is more quickly responsive to $I_{SENSE}$, which allows the circuitry 200 to operate at lower duty cycles (e.g., higher input-to-output voltage ratios) and higher switching frequencies (e.g., smaller L and C).

Moreover, although the node G is directly connected to an external high-voltage switching node, the second input ("−") of the amplifier 204 is directly connected to the node F instead of the node G. Accordingly, the second input ("−") is protected against the switching node's parasitics and ESD, without requiring the amplifier 204 to include additional circuitry for such protection.

Also, $MN_2$ helps to protect $V_{IN}$ against corruption by $V_{OUT}$. In comparison to $MN_1$, $MN_2$ can occupy less silicon area for a given resistance. For example, $MN_2$ and $MN_{SNS}$ can be relatively low-voltage transistors (e.g., because they do not need to stand off the input voltage, but instead only their ohmic drop), which enables better matching between them for more accurate current sensing.

Figure 3A:
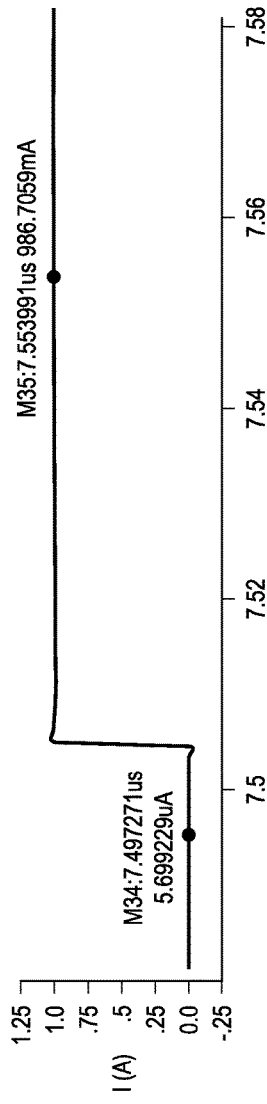
FIG. 3A is a first graph for showing an example operation of the circuitry of FIG. 2.
Figure 3B:
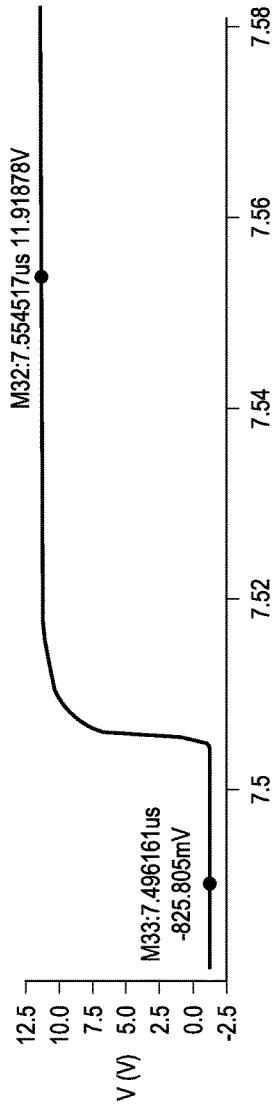
FIG. 3B is a second graph for showing the example operation of the circuitry of FIG. 2.
Figure 3C:
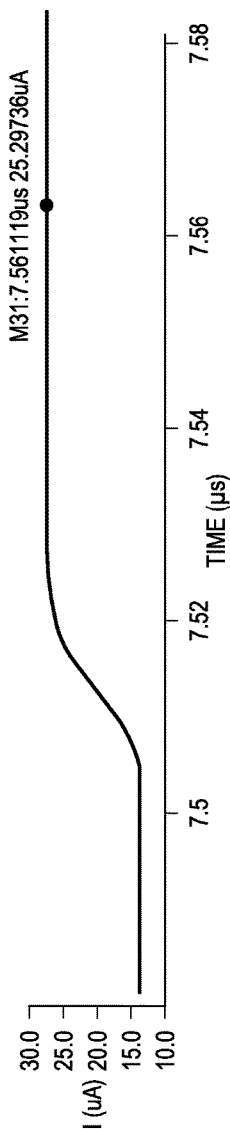
FIG. 3C is a third graph for showing the example operation of the circuitry of FIG. 2.

FIG. 3A is a graph of current through $MN_1$. FIG. 3B is a graph of the voltage $V_{SW}$. FIG. 3C is a graph of the current $I_{SENSE}$. $V_{BOOT}$ is always high enough to turn on $MN_2$ (so that $MN_2$ continues to conduct at least some current, irrespective of whether $MN_1$ is switched on), so the node F's voltage swings within a range of several hundred millivolts, which is significantly less than a range of the voltage $V_{SW}$. $MN_2$'s $V_{DS}$ starts from ~0 volts (instead of $V_{IN}$), so that overshoot is substantially avoided in the current $I_{SENSE}$. As shown in FIG. 3C, the current $I_{SENSE}$ settles at ~25 microamps with relatively short delay (according to speed of feedback between $MN_A$ and the amplifier 204).

Although illustrative embodiments have been shown and described by way of example, a wide range of alternative embodiments is possible within the scope of the foregoing disclosure.

What is claimed is:

1. Circuitry, comprising:
    an inductor for conducting a first current, wherein the first current is variable;
    a first transistor, coupled through the inductor to an output node, for alternately switching on and off in response to a voltage signal, so that the first current is: enhanced while the first transistor is switched on in response to the voltage signal; and limited while the first transistor is switched off in response to the voltage signal;
    a second transistor, coupled to the first transistor, for conducting a second current, wherein: the second current is variable; and on/off switching of the second transistor is independent of the voltage signal; and
    control circuitry for sensing the second current and adjusting the voltage signal to alternately switch the first transistor on and off in response to: the sensing of the second current; and a voltage of the output node.

2. The circuitry of claim 1, wherein the first transistor is coupled through a node to the inductor, and comprising:
    a capacitor coupled between the node and a gate of the second transistor; and
    clamping circuitry for charging the capacitor to a substantially constant voltage.

3. The circuitry of claim 2, and comprising:
    a driver for: receiving the voltage signal; driving the voltage signal to the first transistor; and receiving power from the capacitor.

4. The circuitry of claim 2, wherein the second transistor is for continuing to conduct the second current irrespective of whether the first transistor is switched on.

5. The circuitry of claim 2, wherein the clamping circuitry is coupled through at least one diode to the gate of the second transistor.

6. The circuitry of claim 1, wherein the second transistor is coupled through a first node to the first transistor, and comprising:
    a third transistor for conducting a third current to mirror the second current, wherein a gate of the third transistor is coupled to a gate of the second transistor;
    a fourth transistor, coupled through a second node to the third transistor, for conducting a fourth current to sense the third current; and
    an amplifier for holding a voltage of the first node near a voltage of the second node, wherein the amplifier has a first input coupled to the first node, a second input coupled to the second node, and an output coupled to a gate of the fourth transistor.

7. The circuitry of claim 6, and comprising a fifth transistor for conducting a fifth current to mirror the fourth current, wherein a gate of the fifth transistor is coupled to the gate of the fourth transistor, and wherein sensing the second current includes sensing the second current by sensing the fifth current.

8. The circuitry of claim 7, wherein the first, second, third, fourth and fifth transistors are n-channel field-effect transistors.

9. Circuitry, comprising:
an inductor for conducting a first current, wherein the first current is variable;
a first transistor, coupled through the inductor to an output node, for alternately switching on and off in response to a voltage signal, so that the first current is: enhanced while the first transistor is switched on in response to the voltage signal; and limited while the first transistor is switched off in response to the voltage signal;
a second transistor, coupled through a first node to the first transistor, for conducting a second current, wherein: the second current is variable; and on/off switching of the second transistor is independent of the voltage signal;
a third transistor for conducting a third current to mirror the second current, wherein a gate of the third transistor is coupled to a gate of the second transistor;
a fourth transistor, coupled through a second node to the third transistor, for conducting a fourth current to sense the third current;
an amplifier for holding a voltage of the first node near a voltage of the second node, wherein the amplifier has a first input coupled to the first node, a second input coupled to the second node, and an output coupled to a gate of the fourth transistor;
a fifth transistor for conducting a fifth current to mirror the fourth current, wherein a gate of the fifth transistor is coupled to the gate of the fourth transistor;
a capacitor coupled between a third node and the gate of the second transistor, wherein the first transistor is coupled through the third node to the inductor;
clamping circuitry for charging the capacitor to a substantially constant voltage; and
control circuitry for sensing the second current and adjusting the voltage signal to alternately switch the first transistor on and off in response to: the sensing of the second current; and a voltage of the output node; wherein sensing the second current includes sensing the second current by sensing the fifth current.

10. The circuitry of claim 9, and comprising:
a driver for: receiving the voltage signal; driving the voltage signal to the first transistor; and receiving power from the capacitor.

11. The circuitry of claim 9, wherein the second transistor is for continuing to conduct the second current irrespective of whether the first transistor is switched on.

12. The circuitry of claim 9, wherein the clamping circuitry is coupled through at least one diode to the gate of the second transistor.

13. The circuitry of claim 9, wherein the first, second, third, fourth and fifth transistors are n-channel field-effect transistors.

14. A method, comprising:
conducting a first current through an inductor, wherein the first current is variable;
alternately switching a first transistor on and off in response to a voltage signal, wherein the first transistor is coupled through the inductor to an output node, so that the first current is: enhanced while the first transistor is switched on in response to the voltage signal; and limited while the first transistor is switched off in response to the voltage signal;
conducting a second current through a second transistor that is coupled to the first transistor, wherein: the second current is variable; and on/off switching of the second transistor is independent of the voltage signal;
sensing the second current; and
adjusting the voltage signal to alternately switch the first transistor on and off in response to: the sensing of the second current; and a voltage of the output node.

15. The method of claim 14, wherein the first transistor is coupled through a node to the inductor, and comprising:
with clamping circuitry, charging a capacitor to a substantially constant voltage, wherein the capacitor is coupled between the node and a gate of the second transistor.

16. The method of claim 15, and comprising:
with a driver, receiving the voltage signal, and driving the voltage signal to the first transistor, wherein the driver receives power from the capacitor.

17. The method of claim 15, wherein conducting the second current includes:
continuing to conduct the second current irrespective of whether the first transistor is switched on.

18. The method of claim 15, and comprising:
coupling the clamping circuitry through at least one diode to the gate of the second transistor.

19. The method of claim 14, wherein the second transistor is coupled through a first node to the first transistor, and comprising:
conducting a third current through a third transistor to mirror the second current, wherein a gate of the third transistor is coupled to a gate of the second transistor;
conducting a fourth current through a fourth transistor to sense the third current, wherein the fourth transistor is coupled through a second node to the third transistor; and
with an amplifier, holding a voltage of the first node near a voltage of the second node, wherein the amplifier has a first input coupled to the first node, a second input coupled to the second node, and an output coupled to a gate of the fourth transistor.

20. The method of claim 19, and comprising:
conducting a fifth current through a fifth transistor to mirror the fourth current, wherein a gate of the fifth transistor is coupled to the gate of the fourth transistor, and wherein sensing the second current includes sensing the second current by sensing the fifth current.

* * * * *